US012656633B2

(12) United States Patent
Bouchier et al.

(10) Patent No.: US 12,656,633 B2
(45) Date of Patent: Jun. 16, 2026

(54) EYEWEAR DEVICE WITH PHOTOSENSITIVE SENSORS ARRANGED ON TEMPLES

(71) Applicant: Essilor International, Charenton-le-Pont (FR)

(72) Inventors: Aude Bouchier, Toulouse (FR); Jessica Combier, Labege (FR); Jean-Paul Cano, Lauzerville (FR)

(73) Assignee: Essilor International, Charenton-le-Pont (FR)

( * ) Notice: Subject to any disclaimer, the term of this patent is extended or adjusted under 35 U.S.C. 154(b) by 274 days.

(21) Appl. No.: 18/551,415

(22) PCT Filed: Mar. 31, 2022

(86) PCT No.: PCT/EP2022/058728
§ 371 (c)(1),
(2) Date: Sep. 20, 2023

(87) PCT Pub. No.: WO2022/214396
PCT Pub. Date: Oct. 13, 2022

(65) Prior Publication Data
US 2024/0168318 A1 May 23, 2024

(30) Foreign Application Priority Data
Apr. 7, 2021 (EP) ..................................... 21305447

(51) Int. Cl.
G02C 11/00 (2006.01)
G02C 5/14 (2006.01)
G02C 7/10 (2006.01)

(52) U.S. Cl.
CPC ................. G02C 11/10 (2013.01); G02C 5/14 (2013.01); G02C 7/101 (2013.01)

(58) Field of Classification Search
CPC .......... G02C 11/10; G02C 5/14; G02C 7/101
See application file for complete search history.

(56) References Cited

U.S. PATENT DOCUMENTS 6,349,001 B1 * 2/2002 Spitzer ................... G02C 11/10
351/158
7,448,294 B2 11/2008 Webb
(Continued)

FOREIGN PATENT DOCUMENTS

EP 3 299 871 A1 3/2018
EP 3 258 306 B1 12/2020
(Continued)

OTHER PUBLICATIONS

International Search Report & Written Opinion issued Jul. 20, 2022 in PCT/EP2022/058728 filed on Mar. 31, 2022 15 pages.

*Primary Examiner* — Dmitriy Bolotin
(74) *Attorney, Agent, or Firm* — Oblon, McClelland, Maier & Neustadt, L.L.P.

(57) ABSTRACT
An eyewear device including an electronic frame. The electronic frame includes a front frame element arranged to at least partially house an electrochromic lens, temple connected to the front frame element, a photosensitive sensor arranged on the temple to measure data relating to a light reflected from part of a wearer's face when the electronic frame is worn by the wearer, and a control circuit configured to control the electrochromic lens according to the measured data.

15 Claims, 4 Drawing Sheets

(56) References Cited

U.S. PATENT DOCUMENTS

| | | | | |
|---|---|---|---|---|
| 7,874,666 B2 * | 1/2011 | Xu | | G02C 7/101 |
| | | | | 351/44 |
| 9,482,880 B1 * | 11/2016 | Chandrasekhar | | G02F 1/155 |
| 9,915,831 B2 | 3/2018 | Hue | | |
| 9,977,262 B2 * | 5/2018 | Boulton | | G02C 7/101 |
| 10,339,896 B2 * | 7/2019 | Usui | | G02B 27/017 |
| 10,722,128 B2 | 7/2020 | Mason et al. | | |
| 10,901,249 B2 | 1/2021 | Weindorf et al. | | |
| 11,087,715 B2 | 8/2021 | Park | | |
| 11,215,846 B1 * | 1/2022 | Pomes | | H04N 13/254 |
| 2007/0273611 A1 | 11/2007 | Torch | | |
| 2009/0018419 A1 | 1/2009 | Torch | | |
| 2009/0058660 A1 | 3/2009 | Torch | | |
| 2009/0059159 A1 | 3/2009 | Howell et al. | | |
| 2009/0147215 A1 | 6/2009 | Howell et al. | | |
| 2013/0222235 A1 * | 8/2013 | Abdollahi | | G06F 3/013 |
| | | | | 345/156 |
| 2014/0361185 A1 | 12/2014 | Howell et al. | | |
| 2016/0016004 A1 * | 1/2016 | Hudson | | G02C 11/10 |
| | | | | 607/90 |
| 2016/0139265 A1 * | 5/2016 | Yahav | | G02B 27/0093 |
| | | | | 356/614 |
| 2017/0074721 A1 | 3/2017 | Howell et al. | | |
| 2017/0357108 A1 | 12/2017 | Hofer-Kraner et al. | | |
| 2018/0052319 A1 * | 2/2018 | McCabe | | A61F 9/029 |
| 2018/0081201 A1 * | 3/2018 | Lore | | A61B 5/02438 |
| 2018/0284483 A1 | 10/2018 | Floyd | | |
| 2018/0348050 A1 | 12/2018 | Howell et al. | | |
| 2019/0227347 A1 * | 7/2019 | Jimenez | | G02C 11/08 |
| 2019/0310132 A1 | 10/2019 | Howell et al. | | |
| 2019/0370450 A1 | 12/2019 | Fletcher et al. | | |
| 2020/0038173 A1 * | 2/2020 | Reedy | | G02C 7/044 |
| 2020/0109986 A1 | 4/2020 | Howell et al. | | |
| 2020/0218088 A1 | 7/2020 | Floyd | | |
| 2020/0251070 A1 * | 8/2020 | Park | | G02B 27/01 |
| 2022/0178743 A1 | 6/2022 | Howell et al. | | |
| 2023/0204958 A1 * | 6/2023 | Fliszar | | G06F 3/013 |
| | | | | 345/8 |
| 2023/0367137 A1 * | 11/2023 | Kubala | | G02C 5/2218 |
| 2024/0335112 A1 * | 10/2024 | Park | | A61B 3/14 |

FOREIGN PATENT DOCUMENTS

| | | | |
|---|---|---|---|
| JP | 60-6921 A | | 1/1985 |
| JP | 2001-522063 A | | 11/2001 |
| JP | 2003-225207 A | | 8/2003 |
| JP | 2010-230758 A | | 10/2010 |
| JP | 5947464 B1 | | 7/2016 |
| JP | 2016-535289 A | | 11/2016 |
| JP | 2018-72612 A | | 5/2018 |
| JP | 2020-24415 A | | 2/2020 |
| JP | 2021-500592 A | | 1/2021 |
| WO | WO 2020/094680 A1 | | 5/2020 |

* cited by examiner

EYEWEAR DEVICE WITH PHOTOSENSITIVE SENSORS ARRANGED ON TEMPLES

FIELD OF INVENTION

The invention relates to the field of eyewear devices, and more particularly eyewear devices comprising electronic frame adapted for electrochromic lenses.

BACKGROUND OF THE INVENTION

Ophthalmic lenses help correct vision disorders or refractive errors, also called ametropia, such as myopia, hyperopia, astigmatism and presbyopia. An ophthalmic lens is manufactured based on wearer's ophthalmic prescription. The prescription includes different information such as the sphere value, the cylinder value, the prism and the addition power.

However, even if ophthalmic lenses are manufactured so as to be adapted to different situations for the wearer, in particular progressive lenses making it possible to correct both near vision and far vision, there is a demand for smart glasses having a greater adaptability.

For this purpose, the ophthalmic lens industry has developed electro-active lenses, i.e. lenses of which certain properties can be modified electronically. These changes can be controlled by the wearer or by a healthcare professional, typically an ophthalmologist. These changes can also be automatic, in which case the electro-active lens may comprise sensors configured to measure certain parameters of the environment, for example the light intensity or the wavelength of the light rays.

In particular, among electro-active lenses, electrochromic lenses are capable of changing the light transmission value and of tinting.

Typically an electrochromic lens is an optical system comprising a wafer manufactured based on prescription data and an electrochromic cell allowing the electrochromic lens thus formed to adapt to the brightness or to light intensity. Part of the prescription can also be provided by the electrochromic cell.

An electrochromic cell typically has a structure comprising two piano or afocal transparent outer layers, for example two surfaces made of organic or mineral material, on which transparent electrically conductive coatings are deposited on the inner faces thereof. An electrochromic composition fills a cavity formed between the two electrically conductive coatings. It is thus possible to vary the light transmission value of the cell by applying an electric field between the electrically conductive coatings.

However, an electronic frame adapted for an electrochromic lens presents issues.

In several electronic frames, sensors are arranged on the electronic frame to measure ambient light. These sensors are directed towards the external environment and are positioned on the side of the front surface of the electrochromic lens to measure the incident light or on the side of the rear surface to measure the refracted light. However, the ambient light can be very different from the light effectively received by the wearer's eye and is therefore irrelevant for modifying the light transmission of the electrochromic lens. For instance, if the sun rays come from behind the wearer and if the latter looks at the screen of an electronic device, such as a computer, the measurements collected by the sensors are influenced by the sun rays and the light transmission of the electrochromic lens will thus not be adapted to the brightness of the screen.

In addition, the sensors are commonly arranged on the rings or on the bridge between the rings of the electronic frame. Consequently, since the controller of the electrochromic lens is positioned on one of the temples of the electronic frame, the electrical component connecting a sensor and the controller necessarily passes through a hinge of the electronic frame. However, the passage of the electrical component through the hinge is complex and presents technical difficulties. The presence of sensors on the side of the front surface also imposes aesthetic constraints.

The present invention seeks to improve the situation.

SUMMARY OF THE INVENTION

The present invention concerns an eyewear device comprising an electronic frame.

The electronic frame comprises:

a front frame element arranged to at least partially house an electrochromic lens;

a temple connected to the front frame element;

a photosensitive sensor arranged on the temple to measure data relating to a light reflected from part of a wearer's face when the electronic frame is worn by the wearer; and a control circuit configured to control the electrochromic lens according to the measured data.

According to an embodiment, the eyewear device further comprises an optical system arranged to deflect the light reflected from the part of the wearer's face to the photosensitive sensor when the electronic frame is worn the wearer.

The optical system comprises for instance a deflector arranged on the temple.

According to an embodiment, the eyewear device further comprises an electrochromic lens at least partially housed in the front frame element, wherein the optical system comprises a deflector arranged on the electrochromic lens.

Advantageously, the deflector arranged on the electrochromic lens includes a coating covering at least part of the electrochromic lens.

According to an embodiment, the photosensitive sensor is housed in a blind hole of the temple. The blind hole is oriented towards the part of the wearer's face when the electronic frame is worn by the wearer.

According to an embodiment, the photosensitive sensor is arranged to measure data relating to the light reflected from an eye of the wearer when the electronic frame is worn by the wearer.

Advantageously, the photosensitive sensor is adapted to measure data relating to light within the ultraviolet range or near-infrared range.

More precisely, the photosensitive sensor is for example adapted to measure data relating to light having a wavelength between 900 nm and 1100 nm.

Indeed, the reflection coefficient of an eye reaches higher values in the ultraviolet range and in the near-infrared range than in the visible range.

According to an embodiment, the photosensitive sensor is arranged to measure data relating to the light reflected from a skin area of the wearer when the electronic frame is worn by the wearer.

Advantageously, the photosensitive sensor is adapted to measure data relating to light within the visible range or near-infrared range.

Indeed, the reflection coefficient of the skin reaches higher values in the visible range and in the near-infrared range than in the ultraviolet range.

In a particular embodiment, the photosensitive sensor is arranged to measure data relating to the light reflected from an eye and the light reflected from a skin area of the wearer, and the photosensitive sensor is adapted to measure data relating to light within the near-infrared range, and preferably light having a wavelength between 900 nm and 1100 nm.

According to an embodiment, the control circuit is arranged on the temple and is electrically connected to the photosensitive sensor by an electrical component extending only over a portion of the temple.

In other words, the electrical component connecting the photosensitive sensor and the control circuit does not pass through a hinge of the electronic frame connecting the temple 11 to an end of the front frame element. The structure of the electronic frame is thus less complex and easier to manufacture.

According to an embodiment, the photosensitive sensor is configured to measure data including intensity, illuminance, wavelength or polarization degree of the reflected light and the control circuit is configured to control the electrochromic lens according to the data.

For example, the control circuit is configured to control at least one of the following features of the electrochromic lens:

a light transmission according to the intensity or the illuminance of the reflected light;

a filtering of one or more spectral bands according to the wavelength of the reflected light; and a homogeneity of intensity or illumination for a range of polarization degrees of the reflected light.

The control circuit may be a closed-loop control circuit having one or more of the following inputs:

for controlling the light transmission:

an intensity or illuminance setpoint to be approached for the reflected light, a minimum intensity or luminance to be reached for the reflected light, or a maximum intensity or luminance not to be exceeded for the reflected light, for filtering one or more spectral bands:

a wavelength range to be filtered for the reflected light, for varying the homogeneity of intensity or illumination for the range of polarization degrees:

an intensity or illumination for a polarization degree to be approached for the reflected light.

According to an embodiment, the closed-loop control circuit is a proportional-integral-derivative controller, also called PID controller.

BRIEF DESCRIPTION OF THE DRAWINGS

Other features and advantages of the invention will become apparent from the following description provided for indicative and non-limiting purposes, with reference to the accompanying drawings, wherein.

DETAILED DISCLOSURE

Figure 1:
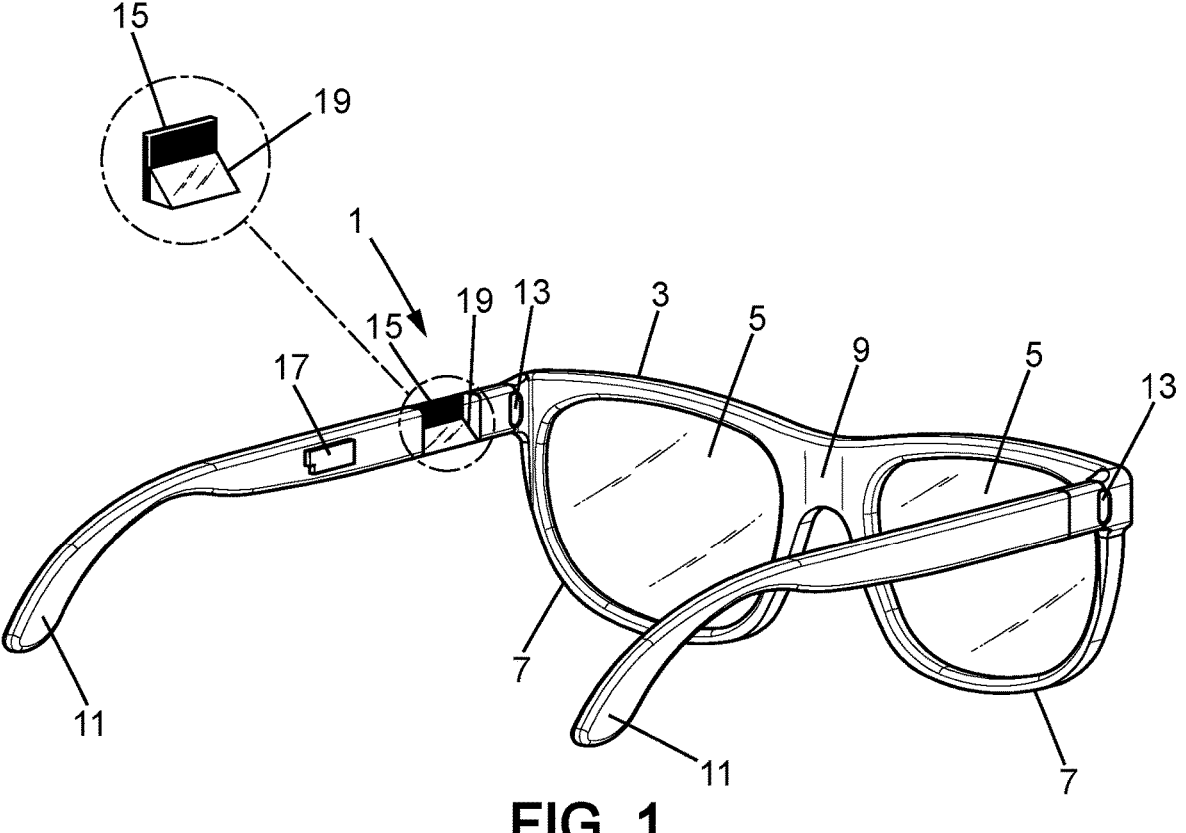
FIG. 1 illustrates in perspective an eyewear device according to an embodiment of the invention.

FIG. 1 illustrates an eyewear device 1.

The eyewear device 1 is adapted to improve the visual comfort of an individual wearing the eyewear device 1. This visual comfort relates in particular to the brightness and the illumination resulting from the environment and from the ambient light.

The eyewear device 1 can also be adapted to correct vision disorders or refractive errors, also called ametropia, of a wearer. For instance, the wearer suffers from myopia, hyperopia, astigmatism or presbyopia.

As illustrated in FIG. 1, the eyewear device 1 comprises an electronic frame 3 and at least one electrochromic lens 5.

The electronic frame 3 is adapted to be worn by a wearer. For instance, when the eyewear device 1 is adapted to correct vision disorders, the electronic frame 3 is adapted to be worn by the wearer to whom prescription data used to manufacture the eyewear device 1 are relative. Indeed, in such a case, the electrochromic lens 5 is designed and manufactured based on prescription data characterizing vision disorders of the wearer.

In a classic way and similarly to non-electrical frames, the electronic frame 3 includes at least one front frame element 7, at least a bridge 9, at least one temple 11 and, in some embodiments, at least one hinge 13.

The front frame element 7 is configured to house at least partially a lens 5, such as an ophthalmic lens. Typically, the front frame element 7 includes a holder configured to house and retain an upper portion of the lens 5 and a cradle configured to at least partially encircle a lower portion of the lens 5.

In the example illustrated in FIG. 1, the electronic frame 3 comprises two front frame elements 7, each one housing at least partially a lens 5. The front frame element is also called "rim" in the literature.

The front frame elements 7 are connected to each other by the bridge 9.

Similarly, the electronic frame 3 illustrated in FIG. 1 includes two temples 11.

Each temple 11 is connected by a hinge 13 to an end of a front frame element 7. More exactly, a temple 11 is connected to an end of a front frame element 7, while the other temple 11 is connected to an end of the other rim front frame element.

The temples 11 are configured to be placed on the ears of the wearer in order to ensure the stability of the eyewear device 1 when the latter is worn by the wearer. The hinges 13 make it possible to unfold the temples 11 when the wearer wishes to wear the eyewear device 1 and to fold the temples 11 when the wearer removes the eyewear device 1.

In the context of the present invention, the frame 3 is an electronic frame and the lens 5 is an electrochromic lens.

The electrochromic lens 5 is an electro-active lens, i.e. lenses of which certain properties can be electronically modified. In particular, the light transmission value and/or the tint of the electrochromic lens 5 can be electrically modified. For instance, the electrochromic lens 5 is controlled by the wearer or by a healthcare professional, typically an ophthalmologist. Alternatively, the light transmission value and the tint can also be automatically modified.

The electrochromic lens 5 includes an electrochromic cell. The electrochromic cell typically has a structure comprising two piano or afocal transparent outer layers, for example two surfaces made of organic or mineral material, on which transparent electrically conductive coatings are deposited on the inner faces thereof. An electrochromic composition fills a cavity formed between the two electrically conductive coatings. It is thus possible to vary the light transmission value of the cell by applying an electric field between the electrically conductive coatings.

It must be noted that the electrochromic lens may also include a wafer designed and manufactured so as to satisfy a wearer's ophthalmic prescription. The wafer is preferably made of transparent material and is adapted to give ophthalmic properties to the electrochromic lens 5.

The wearer's ophthalmic prescription is a set of data, also called prescription data, determined by a healthcare professional, for instance an ophthalmologist. The prescription data includes different information related to the wearer such as the sphere value, the cylinder value, the prism and, if relevant, the addition power. Such prescription data are necessary to design and manufacture an ophthalmic lens intended to be worn by the wearer in order to correct vision disorders or refractive errors, also called ametropia. For instance, when the wearer suffers from presbyopia, the prescription data include an addition power to manufacture progressive ophthalmic lenses adapted to this ametropia.

In such a case, the electrochromic lens 5 is an electrochromic ophthalmic lens.

In the present invention, the light transmission value of the electrochromic lens 5 can be automatically modified. To this end, as illustrated in FIG. 1, the electronic frame 3 comprises at least one photosensitive sensor 15 and a control circuit 17.

The photosensitive sensor 15 is configured to measure data relating to light rays. The data measured by the photosensitive sensor 15 include for instance intensity, illuminance, wavelength or polarization degree of light rays reaching the photosensitive sensor 15.

The photosensitive sensor 15 can be an illumination sensor or an illumination micro-sensor such as a photodiode. The photosensitive sensor 15 can thus measure the illumination in the guise of luminous flux received per unit surface area (in lux or in W·m²). As a variant, the photosensitive sensor 15 can also measure other values of luminous flux, such as intensity, or a visual or photometric luminance. The photosensitive sensor 15 can for instance measure the luminous flux in the visible and/or in the ultraviolet.

The photosensitive sensor 15 can also be a light sensor adapted to measure a polarization degree of the light in order to activate a polarization cutoff functionality for instance. The photosensitive sensor 15 can also be adapted to measure the visible and/or non-visible luminous spectrum so as to activate a wavelength-selective cutoff functionality.

As illustrated in FIG. 1, the photosensitive sensor 15 is arranged on the temple 11. Moreover, the photosensitive sensor 15 is arranged to measure data relating to a light reflected from part of a wearer's face when the electronic frame 3 is worn by the wearer.

More precisely, the skilled person understands here that the photosensitive sensor 15 is advantageously arranged to measure data relating to a light that is both refracted, therefore transmitted, by the electrochromic lens 5 and then reflected from part of the wearer's face but which do not pass through the electrochromic lens 5 are stray rays, and the photosensitive sensor 15 is arranged not to receive such stray light rays.

In other words, when the wearer wears the eyewear device 1, the temples 11 are unfolded and the electronic frame 3 is stabilized on the wearer's ears. The photosensitive sensor 15 is located on the temple 11 so that the light rays received by the photosensitive sensor 15 are light rays previously reflected from part of the wearer's face. This part of the face can be a skin area or an eye.

It is known to the person skilled in the art that the sensors can be arranged on the side of the front surface of the electrochromic lens 5 to measure data relating to the incident light. It is also known that the sensors can be located on the side of the back surface of the electrochromic lens 5 to measure the intensity of the light transmitted or refracted by the electrochromic lens 5.

However, according to the present invention, the photosensitive sensor 15 is arranged on the temple 11 in order to measure data relating to a light reflected from part of a wearer's face when the electronic frame 3 is worn by the wearer.

In addition, the photosensitive sensor 15 is configured to transmit the measured data to the control circuit 17.

In the example illustrated in FIG. 1, the electronic frame 3 comprises only one photosensitive sensor 15. However, the electronic frame 3 may comprise a plurality of photosensitive sensors, such as the photosensitive sensor 15, arranged on the temples 11. In such a case, the photosensitive sensors may be the same or different.

The control circuit 17 is configured to electronically control the electrochromic lens 5 and modify certain properties thereof based on measured data received from the photosensitive sensor 15. In particular, the control circuit 17 is configured to modify the light transmission value of the electrochromic lens 5. The control circuit 17 thus makes it possible to adapt the eyewear device 1 to the light rays.

As illustrated in FIG. 1, the control circuit 17 is arranged on the temple 11. Consequently, the control circuit 17 can be electrically connected to the photosensitive sensor 15 by an electrical component (not shown in the figures) extending only over a portion of the temple 11. In other words, such an electrical component can directly connect the photosensitive sensor 15 and the control circuit 17 without going through the hinge 13.

A functioning of the control circuit 17 will be described in more detail below with reference to FIG. 6.

As previously mentioned, the photosensitive sensor 15 is arranged on the temple 11 to measure data relating to a light reflected from part of a wearer's face when the electronic frame 3 is worn by the wearer.

In order to conduct the light reflected from the part of the wearer's face to the photosensitive sensor 15, the present invention proposes several embodiments. According to a first embodiment, illustrated in FIG. 1 and in FIG. 2, the eyewear device 1 comprises an optical system arranged to deflect the light reflected from the part of the wearer's face to the photosensitive sensor 15 when the electronic frame 3 is worn by the wearer. According to a second embodiment, illustrated in FIG. 3, such an optical system is not necessary and the positioning of the photosensitive sensor 15 is adapted accordingly.

First Embodiment

According to the first embodiment, the eyewear device 1 comprises an optical system arranged to deflect the light reflected from the part of the wearer's face to the photosensitive sensor 15 when the electronic frame 3 is worn by the wearer.

For instance, as illustrated in FIG. 1, the eyewear device 1 further comprises a deflector 19.

The deflector 19 is arranged on the temple 11 in order to deflect the light reflected from the part of the wearer's face to the photosensitive sensor 15 when the electronic frame 3 is worn by the wearer.

The deflector 19 allows for example to deflect only the light coming from a given direction. The deflector is then a holographic deflector, a prism or a diffraction grating.

The deflector 19 comprises for instance one or more reflectors arranged to reflect the light reflected from the part of the wearer's face to the photosensitive sensor 15 when the electronic frame 3 is worn by the wearer.

A zoom in FIG. 1 shows a possible arrangement of the deflector 19 relative to the photosensitive sensor 15. The photosensitive sensor 15 and the deflector 19 are housed in a cavity of the temple 11. The deflector 19 has a deflecting surface inclined relative to an outer surface of the photosensitive sensor 15. Thus, a light ray coming from the part of the wearer's face is deflected by the inclined surface of deflector 19 to photosensitive sensor 15.

Advantageously, the cavity protects the photosensitive sensor 15 against parasitic reflections and avoids reflecting additional light rays towards the photosensitive sensor 15. Likewise, some parts of the deflector 19 are hidden to avoid deflections not coming from the wearer. In other words, the cavity has a particular geometry configured to both avoid reflecting light itself and to prevent light rays, which do not come from the wearer's face, from being deflected towards the photosensitive sensor 15.

Figure 2:
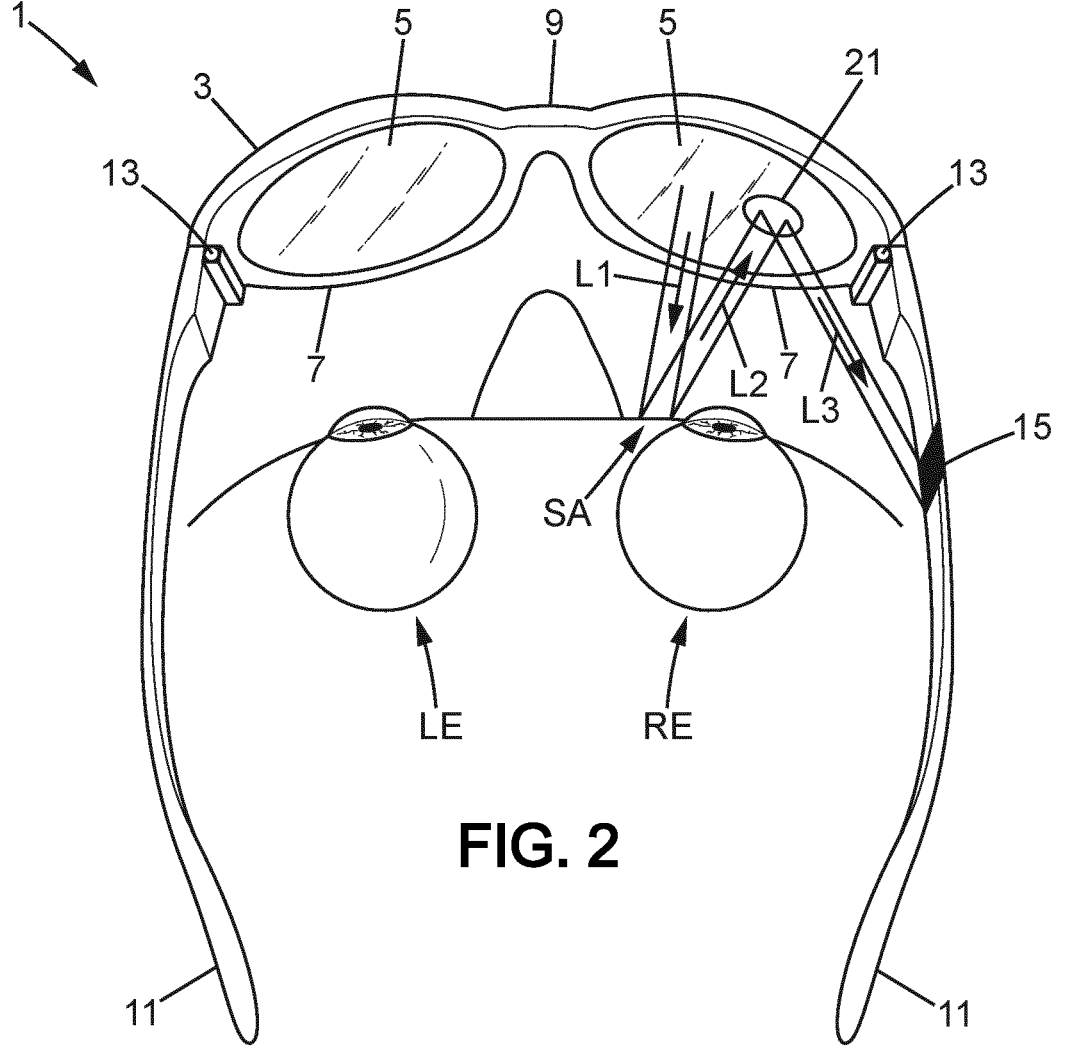
FIG. 2 illustrates a top view of an eyewear device according to another embodiment of the invention.

FIG. 2 also illustrates an embodiment wherein the eyewear device 1 comprises an optical system.

Indeed, as illustrated in FIG. 2, the eyewear device 1 further comprises a deflector 21.

Conversely to the embodiment proposed in FIG. 1, the deflector 21 is not arranged on the temple 11 of the electronic frame 3, but on the electrochromic lens 5. If the electrochromic cell is on the front surface of the electrochromic lens 5, the deflector 21 is preferably on the wafer on the back surface of the electrochromic lens 5.

Similarly to the deflector 19 of the embodiment of FIG. 1, the deflector 21 may comprise one or more reflectors.

The deflector 21 arranged on the electrochromic lens 5 includes for instance a coating covering at least part of the electrochromic lens 5. Such a coating can cover the whole electrochromic lens 5 or only part of it.

The coating must have a sufficiently high reflection coefficient to reflect the light reflected from the wearer's face. However, this reflection coefficient should not filter all the incident radiation transmitted by the electrochromic lens 5.

The deflector 21 is for instance a mirror. Such a mirror can be obtained thanks to a high reflection coating, for instance in the near-infrared range. Indeed, the near-infrared range avoids a perturbation of the wearer through the electrochromic lens 5. In such a case, the coating has for instance a high transmission between 400 and 800 nm, and a high reflection beyond 880 nm.

More precisely, the deflector 21 is a holographic mirror used in the near-infrared range or in the visible range. Advantageously, a holographic mirror has a narrow bandwidth, possibly less than 10 nm that will allow a major part of the spectrum to pass through the electrochromic lens 5 and to keep a natural vision to the wearer. The holographic mirror can be a flat off-axis mirror or a curved off-axis mirror. A curved off-axis mirror can include a focalization action that is used to increase the efficiency of collection of light by the photosensitive sensor 15. A curved-off axis mirror also allows higher angular acceptance on the side of the wearer's face.

In addition, FIG. 2 shows a top view of the eyewear device 1 when it is stabilized on the wearer's ears. It must be noted that certain parts of the wearer's face are illustrated, namely the left eye LE, the right eye RE and a skin area SA.

As illustrated in this figure, a light ray L1 is transmitted by the electrochromic lens 5 and reaches the skin area SA of the wearer's face. This light ray L1 is reflected in a light ray L2 by the skin area SA. It is more precisely a diffuse reflection from the skin area SA. The light ray L2 then reaches the deflector 21 arranged on the electrochromic lens 5. The light ray L2 is then deflected in a light ray L3. The deflector 21 has a deflecting surface configured so that the light ray L3, resulting from the deflection of the light ray L2, is deflected towards the photosensitive sensor 15 arranged on the temple 11. The configuration of the deflector 21 corresponds for instant to a particular orientation of its deflecting surface.

In this example, the photosensitive sensor 15 receives a light reflected from the skin area SA of the wearer's face. However, the photosensitive sensor 15 may receive a light reflected from the left eye LE or the right eye RE of the wearer instead of or in addition to the light reflected from the skin area SA of the wearer.

Regarding this first embodiment of the present invention in which the eyewear device 1 comprises an optical system, the person skilled in the art understands that the deflector 19 of FIG. 1 and the deflector 21 of FIG. 2 can obviously be combined to form together a more complex optical system. In such a case for example and with reference to FIG. 2, the light ray L3 is deflected by the deflector 21 arranged on the electrochromic lens 5 towards the deflector 19 which deflects this light ray L3 to the photosensitive sensor 15.

Second Embodiment

According to the second embodiment, an optical system is not necessary and the positioning of the photosensitive sensor 15 is adapted accordingly.

Figure 3:
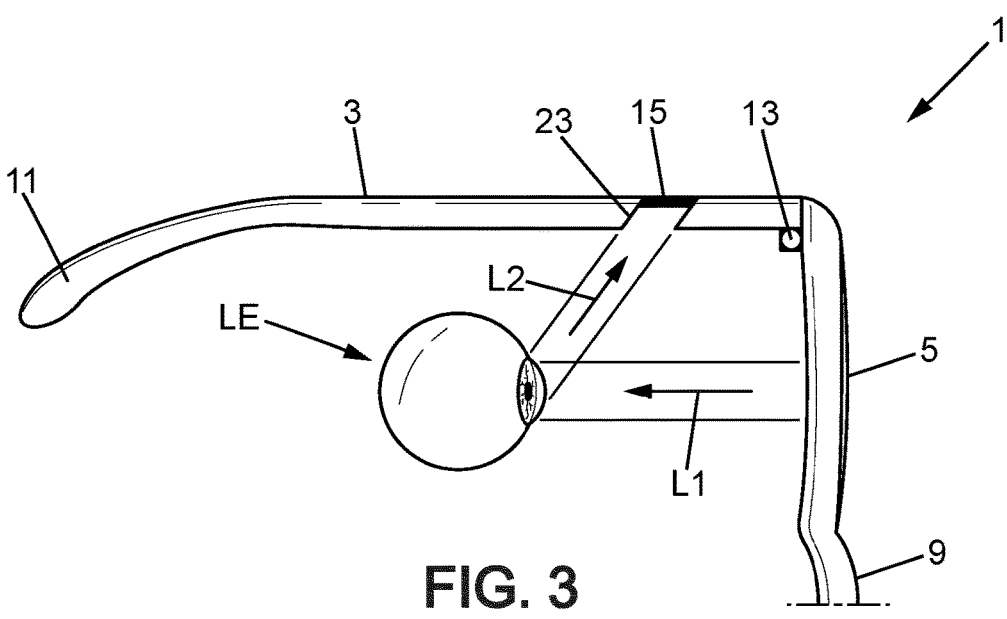
FIG. 3 illustrates a partial view of an eyewear device according to another embodiment of the invention.

As illustrated in FIG. 3, the photosensitive sensor 15 is housed in a blind hole 23 of the temple 11. The blind hole 23 is oriented towards a part of the wearer's face when the electronic frame 3 is worn by the wearer.

The blind hole 23 is formed in the temple 11 of the electronic frame 3. The blind hole 23 is sized so that it can accommodate the photosensitive sensor 15.

Advantageously, only an outer surface of the photosensitive sensor 15 is exposed to the outside, to the open air. This outer surface is directed towards the opening of the blind hole 23 and therefore towards the part of the wearer's face. Conversely, the other surfaces of the photosensitive sensor 15 are concealed and protected by the electronic frame 3.

Such a configuration makes it possible to avoid parasitic radiation, i.e. light rays which are not reflected by the wearer's face, here the left eye LE. A diaphragm (not illustrated here) can be placed at the opening of the blind hole 23 in order to limit the amount of light received by the photosensitive sensor 15.

In the example illustrated in FIG. 3, a light ray L1 is transmitted by the electrochromic lens 5 and reaches the left eye LE of the wearer's face. The light ray L1 is reflected in a light ray L2 by the left eye LE. The light ray L2 then reaches the photosensitive sensor 15 through the blind hole 23 having the correct orientation.

In this example, the photosensitive sensor 15 receives a light reflected from the left eye LE of the wearer's face. However, the photosensitive sensor 15 may receive a light reflected from the right eye RE or a skin area SA of the wearer instead of or in addition to the light reflected from the left eye LE of the wearer.

As indicated above, an optical system is not necessary in this second embodiment to conduct the light reflected from a part of the wearer's face to the photosensitive sensor 15. However, the first embodiment and the second embodiment are not incompatible and can be combined. In particular, the photosensitive sensor 15 can be housed in the blind hole 23 so as to receive a light ray at the output of an optical system such as those described previously in the first embodiment. Regarding the Photosensitive Sensor:

As explained above, the photosensitive sensor 15 is arranged on the temple 11 of the electronic frame 3 to measure data relating to a light reflected from part of a wearer's face when the electronic frame 3 is worn by the wearer. The part of the wearer's face may be an eye or a skin area of the wearer.

More particularly, the photosensitive sensor 15 is configured to measure data including intensity, illuminance, wavelength or polarization degree of the reflected light.

However, the reflection coefficient C varies depending on the wavelength. In addition, the variations in the reflection coefficient C as a function of the wavelength are not the same for an eye and a skin area.

Figure 4:
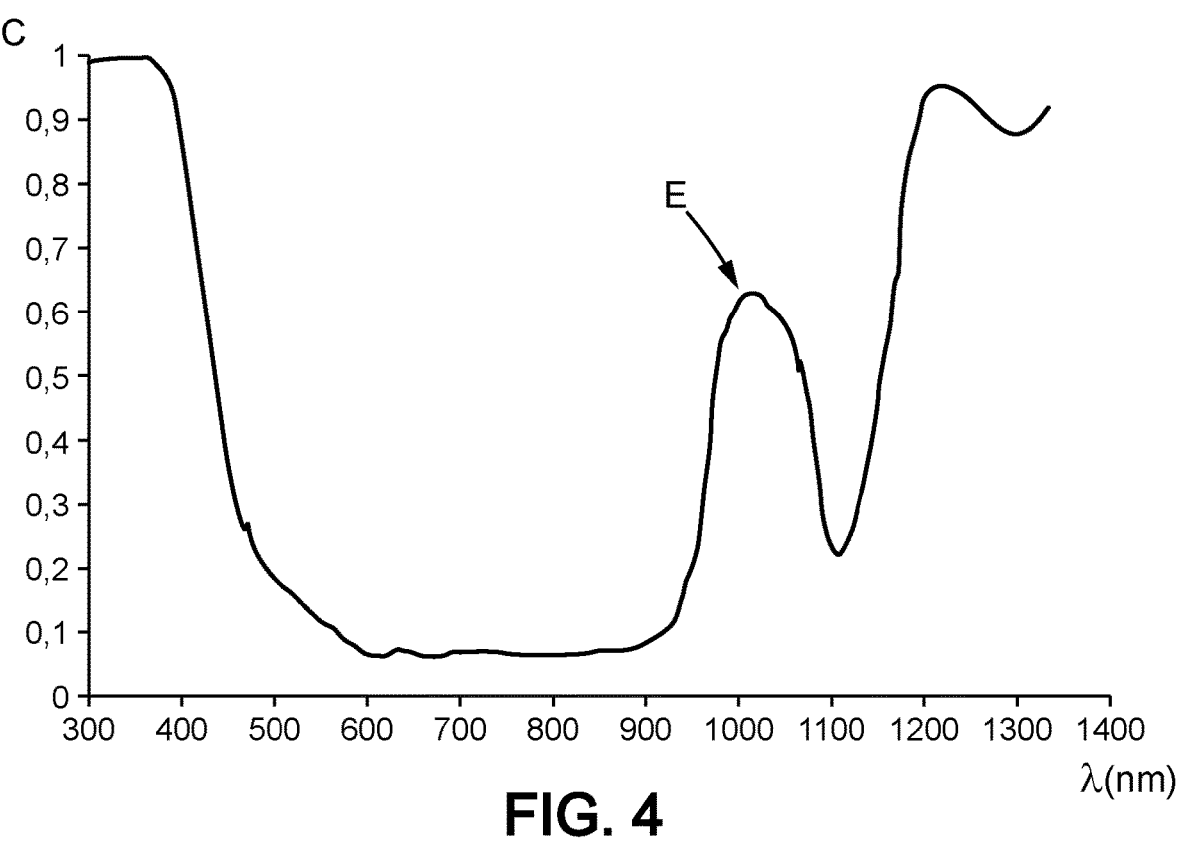
FIG. 4 illustrates the variations in the reflection coefficient of an eye as a function of the wavelength.

FIG. 4 illustrates the variations in the reflection coefficient C of an eye as a function of the wavelength.

The curve E shown in FIG. 4 makes it possible to determine, for a given wavelength value, the reflection coefficient C of the wearer's eye, whether it is the left eye LE or the right eye RE.

It appears that the reflection coefficient C reaches higher values in the ultraviolet range and in the near-infrared range than in the visible range. It is known to the skilled person that the ultraviolet corresponds to a range of wavelengths of between 100 and 400 nm. The near-infrared corresponds to a range of wavelengths of between 780 and 2500 nm.

Consequently, in the embodiment in which the photosensitive sensor 15 is arranged to measure data relating to the light reflected from an eye of the wearer when the electronic frame is worn by the wearer, the photosensitive sensor 15 is advantageously adapted to measure data relating to light within the ultraviolet range or near-infrared range. Obviously, the photosensitive sensor 15 may also be adapted to measure data relating to light within the visible range in addition to or instead of the ultraviolet range or near-infrared range.

In particular, if the selected photosensitive sensor 15 is adapted to measure data relating to light within the ultraviolet range, silicon-carbide (SiC) photodiodes are adapted since their range of detection is 215 to 330 nm.

Moreover, as illustrated in FIG. 2 and FIG. 3, the light ray reflected from part of the wearer's face, the skin area SA in FIG. 2 and the left eye LE in FIG. 3, then received by the photosensitive sensor 15 generally results from a light ray refracted and transmitted by the electrochromic lens 5. This light ray, after refraction, is referenced L1 in FIG. 2 and FIG. 3. Usually, the electrochromic lens 5 is configured to filter out the ultraviolet. In such a case, the photosensitive sensor 15 therefore does not receive a light ray in the ultraviolet range and it can therefore be sufficient for the photosensitive sensor 15 to be adapted to measure data relating to light in the near-infrared range.

Several photosensitive sensors are adapted for near-infrared range. For instance, silicon (Si) photodiodes can be used. The range of detection of silicon photodiodes corresponds to an interval of 200 to 1200 nm, with low efficiency at the extremities and a maximum of efficiency from 800 to 1000 nm. Beyond 1100 nm, it is also possible to use indium-gallium-arsenide (InGaAs) photodiodes that detect a wavelength between 800 and 1700 nm.

As illustrated in FIG. 4, the reflection coefficient C of the eye reaches a local maximum—a peak—between 900 and 1100 nm in the near-infrared range. Therefore, the photosensitive sensor 15 is advantageously adapted to measure data relating to light having a wavelength between 900 nm and 1100 nm.

Figure 5:
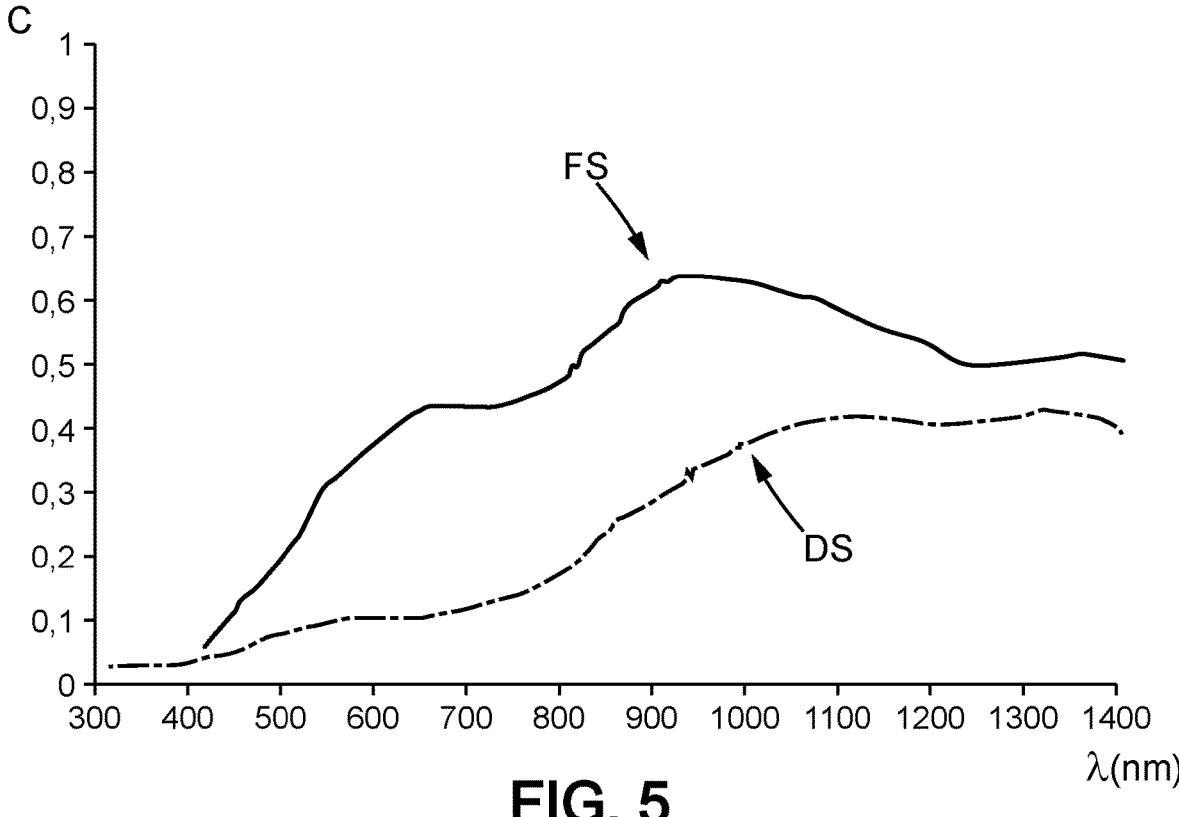
FIG. 5 illustrates the variations in the reflection coefficient of the skin as a function of the wavelength.

FIG. 5 illustrates the variations in the reflection coefficient C of the skin as a function of the wavelength.

More particularly, FIG. 5 illustrates two different curves depending on the pigmentation of the skin The curve DS illustrates the variation of the reflection coefficient C for dark skin, while the curve FS illustrates the variation of the reflection coefficient C for fair skin. It appears in particular that, for a given wavelength value, the reflection coefficient C of a fair skin is generally higher than the reflection coefficient C of a dark skin.

Moreover, for the ultraviolet range, it appears that the reflection coefficient C of the skin is very low, while the reflection coefficient C of the eye is very high.

More generally, the curves DS and FS indicate that, in the embodiment in which the photosensitive sensor 15 is arranged to measure data relating to the light reflected from a skin area SA of the wearer when the electronic frame is worn by the wearer, the photosensitive sensor 15 is advantageously adapted to measure data relating to light within the visible range or near-infrared range. Obviously, the photosensitive sensor 15 may also be adapted to measure data relating to light within the ultraviolet range in addition to or instead of the visible range or near-infrared range.

It is known to the skilled person that the visible range corresponds to a range of wavelengths of between 400 and 780 nm.

In the field of photosensitive sensors for the visible range, silicon (Si) photodiodes and ambient light sensors (known by the acronym ALS) are particularly adapted. Ambient light sensors are silicon (Si) photodiodes with a photopic filter to simulate the human vision.

Moreover, as explained previously, the photosensitive sensor 15 can be arranged on the temple 11 of the electronic frame 3 to measure both data relating to a light reflected from the wearer's eye and data relating to a light reflected from a skin area SA of the wearer.

For example, in FIG. 2, the light ray L3 results from the reflection of the light ray L1 by the skin area SA of the wearer. However, it is also possible that light rays are reflected from the right eye RE of the wearer to the deflector 21 arranged on the electrochromic lens 5 and then deflected again by the deflector 21 to the photosensitive sensor 15. In such a case, the light rays received by the photosensitive sensor 15 are light rays reflected by the skin area SA and the wearer's right eye RE. Likewise, in the example illustrated in FIG. 3, light rays can also be reflected from a skin area SA of the wearer and reach the photosensitive sensor 15 through the blind hole 23.

Consequently, according to an embodiment, the photosensitive sensor 15 is arranged to measure data relating to the light reflected from an eye and the light reflected from a skin area of the wearer. In such a case, the photosensitive sensor 15 is adapted to measure data relating to light within the near-infrared range, and preferably light having a wavelength between 900 nm and 1100 nm.

Indeed, the near-infrared range corresponds to a high reflection coefficient C for both the eye, as illustrated by the curve E of FIG. 4, and for the skin, as illustrated by curves DS and FS of FIG. 5.

Regarding the Control Circuit:

The control circuit 17 is configured to control the electrochromic lens 5 according to the data MSR measured by the photosensitive sensor 15.

The electrochromic lens 5 can be seen as an active multi-layer system having one or more features controlled by the control circuit 17 based on the data MSR measured by the photosensitive sensor 15. The electrochromic lens 5 has at least one of the following features: a light transmission layer, a spectral band filtering layer and a polarization layer.

Advantageously, as illustrated in FIG. 1, the control circuit 17 is arranged on the temple 11 of the electronic frame 3. The control circuit 17 is not shown in FIG. 2 and FIG. 3, however the person skilled in the art obviously understands that, in these embodiments, the control circuit 17 can also be arranged on the temple 11.

In such a case, as explained above, the control circuit 17 is electrically connected to the photosensitive sensor 15 by an electrical component extending only over a portion of the temple 11, thus without going through the hinge 13.

Figure 6:
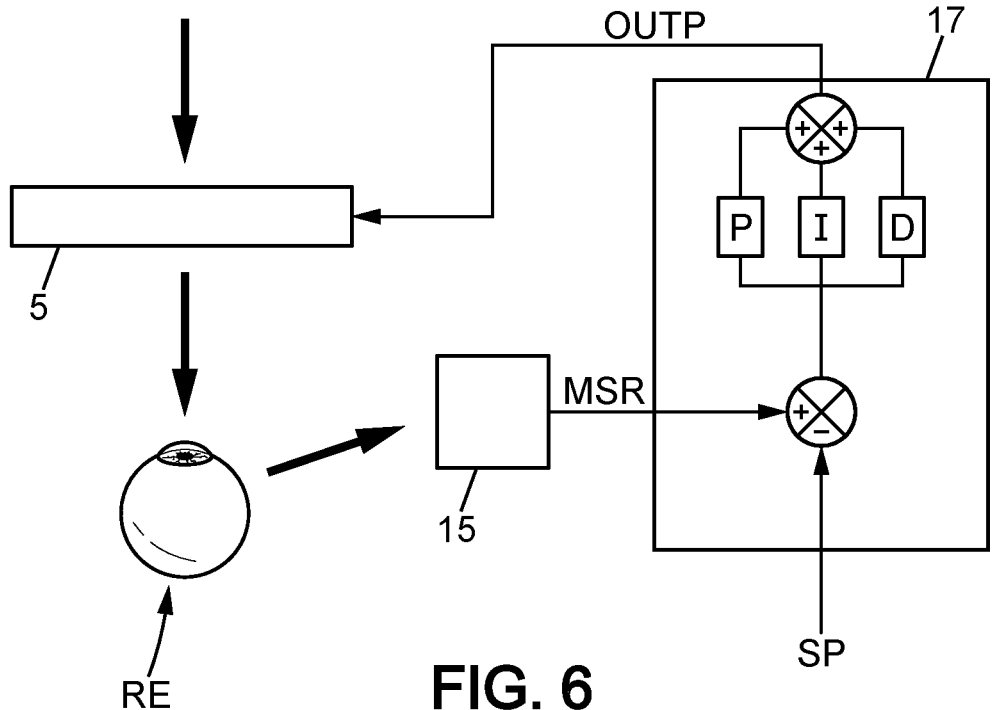
FIG. 6 schematically illustrates a control circuit configured to control an electrochromic lens of the eyewear device according to data measured by a photosensitive sensor.

A functioning of the control circuit 17 is illustrated in FIG. 6.

In the example illustrated in FIG. 6, the photosensitive sensor 15 is arranged to measure data MSR relating to the light reflected from the right eye RE of the wearer when the electronic frame 3 is worn by the wearer. Typically, the measured data MSR include intensity, illuminance, wavelength or polarization degree of the reflected light.

The measured data MSR are then transmitted from the photosensitive sensor 15 to the control circuit 17.

The control circuit 17 is for instance configured to control at least one of the above-mentioned features of the electrochromic lens 5:

the light transmission according to the intensity or the illuminance of the reflected light;

the filtering of one or more spectral bands according to the wavelength of the reflected light; and a homogeneity of intensity or illumination for a range of polarization degrees of the reflected light.

Advantageously, the control circuit 17 is a closed-loop control circuit. In such an embodiment, the operation of the control circuit 17 is ruled not only by the data MSR measured by the photosensitive sensor 15 but also by one or more inputs. As previously explained, the control unit 17 controls one or more features of the electrochromic lens 5.

The inputs for controlling the light transmission of the electrochromic lens 5 are for instance the following:

an intensity or illuminance setpoint to be approached for the reflected light, a minimum intensity or luminance to be reached for the reflected light, or a maximum intensity or luminance not to be exceeded for the reflected light.

The input for filtering one or more spectral bands is for instance a wavelength range to be filtered for the reflected light.

Finally, the input for varying the homogeneity of intensity or illumination for a range of polarization degrees of the reflected light is for instance a light intensity or illumination for a given polarization direction or degree to be approached for the reflected light.

As previously explained, the electronic frame 3 may comprise a plurality of photosensitive sensors 15. The electronic frame 3 has for instance one sensitive sensor 15 per temple 11. The data MSR measured by the plurality of photosensitive sensors 15 can be compared together. The measurements MSR may also be processed in order to determine the minimum, the maximum or the mean of the measurements MSR. In the case wherein each photosensitive sensor 15 acquires several measurements MSR, for example an illumination or intensity for different ranges of polarization degrees, the measured data MSR can be processed in order to determine the polarization degree with the maximal illumination or intensity and the corresponding excess of illumination or intensity defined as the difference between its measured illumination or intensity and the mean illumination or intensity for all polarization degrees.

In addition, if a photosensitive sensor measures erroneous data, then these measurements can be excluded based on measurements MSR collected by another photosensitive sensor.

Typically, the closed-loop control circuit is a proportional-integral-derivative controller, also called PID controller.

As illustrated in FIG. 6 in the form of a functional diagram (or block diagram), the control circuit 17 receives as input data MSR measured by the photosensitive sensor 15 as well as a target value, also called setpoint, SP of intensity or illumination. The control circuit 17 is then configured to measure the difference between the measured intensity or illumination and the target intensity or illumination. In the embodiment described here, the control circuit 17 is thus configured to determine a proportional response, an integral response and a derivative response to this difference.

Of course, a PID controller is also suitable for filtering wavelengths. The control circuit 17 can receive as input one or more wavelength ranges which must be filtered by the electrochromic lens 5, for example the ultraviolet range or the infrared range. In such a case, the setpoint is not necessarily a precise wavelength but the wavelength range corresponding to the visible domain.

In addition, the setpoint can relate to a degree of homogeneity of intensity or illumination for a range of polarization degrees. The control circuit 17 then calculates, for each polarization degree, the difference between the measured intensity or illumination and the mean intensity or illumination for the range of polarization degrees. In the embodiment in which the control circuit 17 is a PID controller, a proportional response, an integral response and a derivative response to this difference are determined. The difference calculated for a given polarization degree characterizes the homogeneity of intensity or illumination for a range of polarization degrees and is for instance compared to a predetermined threshold.

The setpoint can be set by the user. In addition, the setpoint can also be automatically updated by considering several parameters such as the sensitivity of the wearer and the ambient light. For example, when the wearer is in a dark environment for a long time and then finds himself or herself in a brighter environment, the setpoint can be automatically adjusted without the intervention of the wearer. A change of setpoint is for example triggered when, from one instant to another, a difference in the measurement of the light intensity or of the illumination is greater than a predetermined threshold. The updated setpoint is thus calculated based on the previous setpoint, the difference detected and the previous illumination.

In a PID controller, each of the responses, therefore the proportional response, the integrative response and the derivative response, are respectively characterized by a coefficient, also called gain in the literature.

Furthermore, it may be advantageous to use fuzzy logic to configure the operation of the PID controller. In one embodiment, the gains or a weighted sum of the control terms, i.e. proportional, integral and derivative terms, are replaced by a fuzzy logic function. The inputs of the fuzzy logic function are an error, the variation of the error and a sum of errors. Alternatively, the gains or the weighted sump of the PID controller are determined using fuzzy logic. Of course, other uses of fuzzy logic are possible.

Fuzzy logic is particularly suitable when the electrochromic lens 5 has a non-linear behavior. Indeed, oscillation of the light transmission or the polarization can occur when the measurement is close to the set point, i.e. when the intensity, illuminance or polarization degree is sometimes lower and sometimes higher than the target value in a short time interval. This situation is not comfortable for the wearer. It is thus interesting to improve the functioning of the control circuit 17 by including fuzzy logic and other prediction filters as Kalman filters to smooth the reactions of the electrochromic lens 5.

The present invention has several advantages.

First of all, the measurement of data relating to the light reflected by a part of the wearer's face, for example an eye or a skin area, makes it possible to have relevant data since these data relate to the light which actually reaches the wearer's face. The measurement sensor is thus little influenced by ambient light. The control of electrochromic lenses by the control circuit is thus improved and more suitable for correcting visual discomfort for the wearer.

In addition, the positioning of the photosensitive sensor on the temple allows a simpler electrical connection with the control circuit. Indeed, the electronic component which electrically connects the photosensitive sensor and the control circuit does not pass through the hinge, which avoids complications during the manufacturing of the eyewear device.

Finally, the choice of the photosensitive sensor makes it possible to adapt to different configurations, in particular when the light rays received by the photosensitive sensor are reflected by the skin area or the eye of the wearer. Indeed, the respective reflection coefficients of the eye and of the skin area are not the same and the photosensitive sensor must be calibrated on the wavelengths reflected by the part of the wearer's face selected.

The invention claimed is:

1. An eyewear device comprising:
an electronic frame, wherein said electronic frame comprises:
  a front frame element at least partially housing an electrochromic lens,
  a temple connected to said front frame element,
  a photosensitive sensor arranged on said temple to measure data relating to a light refracted by the electrochromic lens and reflected from part of a wearer's face when the electronic frame is worn by said wearer, and
  a control circuit configured to control the electrochromic lens according to said measured data, wherein data measured by the photosensitive sensor includes intensity, illuminance, wavelength or polarization degree of the reflected light and the control circuit is configured to control the electrochromic lens according to said data, and
the control circuit is configured to control at least one of the following features of the electrochromic lens:
  a light transmission according to the intensity or the illuminance of the reflected light,
  a filtering of one or more spectral bands according to the wavelength of the reflected light, and
  a homogeneity of intensity or illumination for a range of polarization degrees of the reflected light.

2. The eyewear device of claim 1, further comprising an optical system arranged to deflect the light reflected from the part of the wearer's face to the photosensitive sensor when the electronic frame is worn by said wearer.

3. The eyewear device of claim 2, wherein the optical system comprises a deflector arranged on said temple.

4. The eyewear device of claim 2, wherein the optical system comprises a deflector arranged on the electrochromic lens.

5. The eyewear device of claim 4, wherein the deflector arranged on the electrochromic lens includes a coating covering at least part of the electrochromic lens.

6. The eyewear device of claim 1, wherein the photosensitive sensor is housed in a blind hole of the temple, said blind hole being oriented towards said part of the wearer's face when the electronic frame is worn by said wearer.

7. The eyewear device of claim 1, wherein the photosensitive sensor is arranged to measure data relating to the light reflected from an eye of the wearer when the electronic frame is worn by said wearer.

8. The eyewear device of claim 7, wherein the photosensitive sensor is adapted to measure data relating to light within an ultraviolet range or near-infrared range.

9. The eyewear device of claim 7, wherein the photosensitive sensor is adapted to measure data relating to light having a wavelength between 900 nm and 1100 nm.

10. The eyewear device of claim 1, wherein the photosensitive sensor is arranged to measure data relating to the light reflected from a skin area of the wearer when the electronic frame is worn by said wearer.

11. The eyewear device of claim 10, wherein the photosensitive sensor is adapted to measure data relating to light within a visible range or near-infrared range.

12. The eyewear device of claim 1, wherein the photosensitive sensor is arranged to measure data relating to the light reflected from an eye and the light reflected from a skin area of the wearer, and wherein said photosensitive sensor is adapted to measure data relating to light within a near-infrared range.

13. The eyewear device of claim 1, wherein the control circuit is arranged on the temple and is electrically connected to the photosensitive sensor by an electrical component extending only over a portion of said temple.

14. The eyewear device of claim 1, wherein the control circuit is a closed-loop control circuit having one or more of the following inputs:
for controlling the light transmission:
  an intensity or illuminance setpoint to be approached for the reflected light,
  a minimum intensity or luminance to be reached for the reflected light, or
  a maximum intensity or luminance not to be exceeded for the reflected light,
for filtering one or more spectral bands:

a wavelength range to be filtered for the reflected light,
for varying the homogeneity of intensity or illumination
for the range of polarization degrees:
an intensity or illumination for a polarization degree to
be approached for the reflected light.

15. The eyewear device of claim 14, wherein the closed-loop control circuit is a proportional-integral-derivative controller, also called PID controller.

\* \* \* \* \*